(12) United States Patent
Choi et al.

(10) Patent No.: US 9,536,634 B2
(45) Date of Patent: Jan. 3, 2017

(54) INSULATING WIRE HAVING PARTIAL DISCHARGE RESISTANCE AND HIGH PARTIAL DISCHARGE INCEPTION VOLTAGE

(71) Applicant: LS Cable & System Ltd., Anyang-si, Gyeonggi-do (KR)

(72) Inventors: Hyung-Sam Choi, Seoul (KR); Joon-Hee Lee, Gunpo-si (KR); Bo-Kyung Kim, Daegu (KR); Dong-Jin Seo, Gunpo-si (KR); Jae-Geon Lee, Gunpo-si (KR)

(73) Assignee: LS CABLE & SYSTEM LTD., Anyang-si, Gyeonggi-do (KR)

( * ) Notice: Subject to any disclaimer, the term of this patent is extended or adjusted under 35 U.S.C. 154(b) by 382 days.

(21) Appl. No.: 14/161,919

(22) Filed: Jan. 23, 2014

(65) Prior Publication Data

US 2014/0220343 A1 Aug. 7, 2014

(30) Foreign Application Priority Data

Feb. 1, 2013 (KR) .................. 10-2013-0011591

(51) Int. Cl.
*H01B 3/18* (2006.01)
*C09D 7/12* (2006.01)
(Continued)

(52) U.S. Cl.
CPC ............... *H01B 3/18* (2013.01); *C09D 7/1216* (2013.01); *C09D 7/1266* (2013.01);
(Continued)

(58) Field of Classification Search
CPC ........... H01B 3/12; H01B 3/441; H01B 3/427; H01B 3/46; H01B 3/00; H01B 7/288; H01B 7/17; H01B 3/006; H01B 3/306; H01B 3/308; B05D 3/02; G02B 6/4494; G02B 6/4407; G02B 6/44; C01B 33/18; C01B 39/02; C01B 39/14; C01B 39/20; C01B 39/24; C01B 39/26; C01B 39/28; C01B 39/30; C01B 39/32; C01B 39/38; C01B 39/54; B01J 29/04; B01J 29/06; B01J 39/00; C01F 1/00; C09D 7/1216; C09D 7/1266; C09D 7/1291; C09D 199/00; C08K 3/36; C08K 7/24; Y10T 428/2927; B32B 5/02
(Continued)

(56) References Cited

U.S. PATENT DOCUMENTS 6,205,276 B1 * 3/2001 Anelli .................. G02B 6/4494
385/100
2009/0030134 A1 1/2009 Sasaki et al.
(Continued)

FOREIGN PATENT DOCUMENTS

BR WO 2012171090 A1 * 12/2012 .............. B01J 39/00
CN 1572832 A 2/2005
(Continued)

OTHER PUBLICATIONS

Ginter et al., FAU Linde Type Y Synthesis, http://www.iza-online.org/synthesis/Recipes/Linde%20Type%20Y.html. Mar. 10, 2016.*

Primary Examiner — Hai Vo
(74) Attorney, Agent, or Firm — Paratus Law Group, PLLC

(57) ABSTRACT

The present invention relates to an insulating wire and, more particularly, to an insulating wire having partial discharge resistance that exhibits excellent partial discharge resistance and high partial discharge inception voltage and also excellences in the adhesion between the conductor and the
(Continued)

insulation layer and the flexibility of the insulation layer, which insulating wire can be prepared by a simple process at a low production cost.

5 Claims, 2 Drawing Sheets

(51) Int. Cl.
    *H01B 3/30*     (2006.01)
    *C08K 3/00*     (2006.01)

(52) U.S. Cl.
    CPC ............ *C09D 7/1283* (2013.01); *H01B 3/305* (2013.01); *H01B 3/306* (2013.01); *C08K 3/0033* (2013.01); *Y10T 428/2958* (2015.01); *Y10T 428/2982* (2015.01)

(58) Field of Classification Search
    USPC ....... 428/372; 106/222; 385/100; 174/110 S, 174/110 R; 427/120
    See application file for complete search history.

(56) References Cited

U.S. PATENT DOCUMENTS

| | | | |
|---|---|---|---|
| 2009/0114416 A1* | 5/2009 | Kaiser | H01B 3/12 174/110 S |
| 2009/0226720 A1 | 9/2009 | Kikuchi et al. | |

FOREIGN PATENT DOCUMENTS

| | | |
|---|---|---|
| CN | 101525517 A | 9/2009 |
| JP | 2003-160728 A | 6/2003 |
| JP | 2004-010714 A | 1/2004 |
| JP | 2009-212034 A | 9/2009 |
| JP | 2012-119117 A | 6/2012 |
| KR | 2006-0018347 A | 3/2006 |
| KR | 2008-0072691 A | 8/2008 |
| KR | 2010-0121513 A | 11/2010 |

* cited by examiner

INSULATING WIRE HAVING PARTIAL DISCHARGE RESISTANCE AND HIGH PARTIAL DISCHARGE INCEPTION VOLTAGE

CROSS-REFERENCE TO RELATED APPLICATION

This application claims priority to Korean Patent Application No. 10-2013-0011591 filed in Republic of Korea on Feb. 1, 2013, the entire contents of which are incorporated herein by reference.

BACKGROUND OF THE INVENTION

Field of the Invention

The present invention relates to an insulating wire and, more particularly, to an insulating wire having partial discharge resistance that exhibits excellent partial discharge resistance and high partial discharge inception voltage and also excellences in the adhesion between the conductor and the insulation layer and the flexibility of the insulation layer, which insulating wire can be prepared by a simple process at a low production cost.

Background Art

The insulating wire refers to a coated insulating wire such as enameled wires used in the form of a coil for electronic devices, including motors, transformers, etc. When the insulating wire applied to a high-voltage motor has low partial discharge inception voltage and poor partial discharge resistance, the localized electric field is concentrated at the tiny gaps between the insulation layers or inside the insulation layer. This can result in partial discharge of electrical energy called corona, ending up a breakdown of the insulation layer.

The charged particles generated as a result of the partial discharge conflict with one another to generate heat and damage the insulation layer to break down, causing insulation breakdown. With a recent trend of using the systems with inverter-driven motors for the purpose of energy conservation, there are a growing number of cases a breakdown of insulation takes place due to the inverter serge in the systems using inverter-driven motors. It has proved that such a breakdown of insulation associated with the inverter serge comes down to the partial discharge which is caused by the overvoltage with the inverter serge.

Korean Patent Open-Laid Publication Nos. 2010-0121513, 2008-0072691 and 2006-0018347 and Japanese Patent Open-Laid Publication Nos. 2004-010714 and 2003-160728 disclose insulating wires using inorganic nanoparticles excellent in partial discharge resistance, such as silica, alumina, titanium oxide, etc., in an insulation coating resin constituting an insulation layer in order to provide the insulating wires with partial discharge resistance. The inorganic nanoparticles not only provide the insulating wires with partial discharge resistance but also contribute to promotion of heat conductivity and strengths and reduction of thermal expansion.

FIG. 1 is a schematic cross-sectional view showing the structure of a conventional insulating wire having an insulation layer containing inorganic nanoparticles. The conventional insulating wire includes, as shown in FIG. 1, a conductor 1 made of a conductive material, such as aluminum, copper, etc., and an insulation layer 2 made of an insulation coating resin disposed to cover around the conductor 1 and containing inorganic nanoparticles 3 having partial discharge resistance.

With an increase in the content of the inorganic nanoparticles 3 in the insulation layer 2, the insulating wire enhances in the partial discharge resistance but undesirably deteriorates in regards to the adhesion between the conductor 1 and the insulation layer 2 and the flexibility of the insulation layer 2. Accordingly, when a wire having a high content of the inorganic nanoparticles 3 in the insulation layer 2 is applied to the coil for electrical devices, a number of cracks occur in the insulation layer 2, resulting in failure to acquire the partial discharge resistance which is the genuine object of the wire.

The insulating wire having the insulation layer 2 containing the inorganic nanoparticles 3 has an effect to suppress a breakdown of insulation caused by the existing partial discharge but cannot prevent the occurrence of the partial discharge fundamentally.

On the other hand, Japanese Patent Laid-Open Publication Nos. 2009-212034 and 2012-119117 and United State patent Laid-Open Publication Nos. 2009-0226720 and 2009-0030134 describe insulating wires that include an insulation layer containing hollow or porous inorganic nanoparticles to secure a low dielectric constant of the insulation layer and thus increase the partial discharge inception voltage, thereby preventing occurrence of the partial discharge.

However, the hollow inorganic nanoparticles which are hollow nano-sized silica are prepared by a complicated preparation process of hollow nanoparticles with a rise of the production cost and also have the difficulty of acquiring a sufficiently low dielectric constant and a high partial discharge inception voltage.

Accordingly, there is a demand for an insulating wire having partial discharge resistance and high partial discharge inception voltage that exhibits excellences in the adhesion between the conductor and the insulation layer and the flexibility of the insulation layer, involves a simple preparation process and a low production cost, and has partial discharge resistance and high partial discharge inception voltage.

SUMMARY OF THE INVENTION

It is therefore an object of the present invention to provide an insulating wire having partial discharge resistance that includes an insulation layer having a high partial discharge inception voltage as well as partial discharge resistance.

It is another object of the present invention to provide an insulating wire that exhibits excellences not only in partial discharge resistance and partial discharge inception voltage characteristics but also in the adhesion between the conductor and the insulation layer and the flexibility of the insulation layer.

It is further another object of the present invention to provide an insulating wire that involves a simple preparation process and a low production cost in spite of having excellences in partial discharge resistance, partial discharge inception voltage, the adhesion between the conductor and the insulation layer, and the flexibility of the insulation layer.

To achieve these objects, the present invention provides an insulating wire having partial discharge resistance, comprising a conductor and an insulation layer, the insulation layer being disposed to cover around the conductor and containing a polymer base resin and inorganic particles, the content of the inorganic particles being 10 to 30 parts by weight with respect to 100 parts by weight of the polymer base resin, the inorganic particles comprising 10 to 60 parts by weight of dry zeolite particles and 40 to 90 parts by weight of inorganic nanoparticles with respect to 100 parts by weight of the inorganic particles.

In accordance with one embodiment, the dry zeolite particles may have a porosity of 18 to 50% with respect to the total volume. Also, the dry zeolite particles may have an inner porosity of 45 to 55% and an outer porosity of 30 to 40% out of the total porosity. Further, the dry zeolite particles may be prepared by processing at least one synthetic zeolite selected from the group consisting of $Na_{12}[(AlO_2)_{12}(SiO_2)_{12}].27H_2O$, $Na_4TMA_3[(AlO_2)_7(SiO_2)_{17}].21H_2O$, $Na_8TMA[(AlO_2)_9(SiO_2)_{15}].28H_2O$, $Na_{86}[(AlO_2)_{86}(SiO_2)_{106}].264H_2O$, $Na_{56}[(AlO_2)_{56}(SiO_2)_{136}].250H_2O$, $(Na_2,K_2,Ca,Mg)_{29.5}[(AlO_2)_{59}(SiO_2)_{133}].235H_2O$ and $Ca_2[(AlO_2)_4(SiO_2)_8].13H_2O$ to a micro-scaled size and then dehydrating and drying by heat.

In another embodiment, the dry zeolite particles may have a diameter of 1 to 10 μm, the inorganic nanoparticles having a diameter of 4 to 50 nm. the conductor may have a round or flat shape. Also, the polymer base resin may be a polyimide resin or a polyamide imide resin.

In other embodiments, the insulation layer may comprise at least one adhesive agent selected from the group consisting of a melamine-based compound, an amine-based compound, a mercaptan-based compound, and a polycarbodiimide-based compound in an amount of 1 to 3 parts by weight with respect to 100 parts by weight of the polymer base resin. Also, the insulation layer may have a dielectric constant of 2.5 to 3.5. Furthermore, the inorganic nanoparticles may comprise at least one selected from the group consisting of silica, alumina, titanium dioxide, zirconia, yttria, mica, clay, chromium oxide, zinc oxide, iron oxide, magnesium oxide, calcium oxide, scandium oxide and barium oxide.

Effects of the Invention

The insulating wire having partial discharge resistance according to the present invention includes dry zeolite particles in its insulation layer to secure a low dielectric constant of the insulation layer and hence a rise of the partial discharge inception voltage, thereby having a good effect to suppress the partial discharge.

Further, the insulating wire having partial discharge resistance according to the present invention includes a combination of the micro-sized dry zeolite particles and nano-sized inorganic particles at a predetermined mixing ratio to achieve a uniform dispersion of the zeolite particles, thereby having a good effect to enhance the adhesion between the conductor and the insulation layer, the flexibility of the insulation layer, the surface roughness of the wire, the insulation withstanding voltage, the mechanical strengths, and so forth.

Furthermore, the insulating wire having partial discharge resistance according to the present invention involves a simple preparation process and a low production cost by using micro-sized zeolite particles which are porous in themselves without a need for performing a separate process to form a hollow or porous structure, in the place of the conventional hollow or porous nanoparticles which involve a complicated preparation process and a high production cost.

DETAILED DESCRIPTION OF THE PREFERRED EMBODIMENT

Hereinafter, preferred embodiments of the present invention will be described in further detail with reference to the accompanying drawings. The present invention may, however, be embodied in many different forms and should not be construed as limited to the embodiments set forth herein. Rather, these embodiments are provided so that this disclosure will be thorough and complete, and fully convey the scope of the invention to those skilled in the art. Throughout the specification, the same reference numbers may be used to denote similar components in various embodiments.

Figure 1:
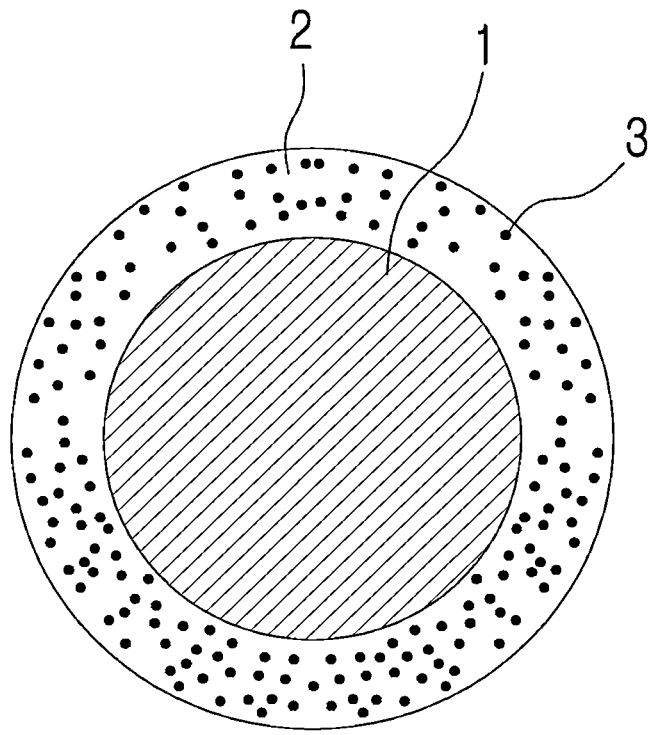
FIG. 1 is a schematic cross-sectional view showing the structure of a conventional insulating wire having partial discharge resistance.
Figure 2:
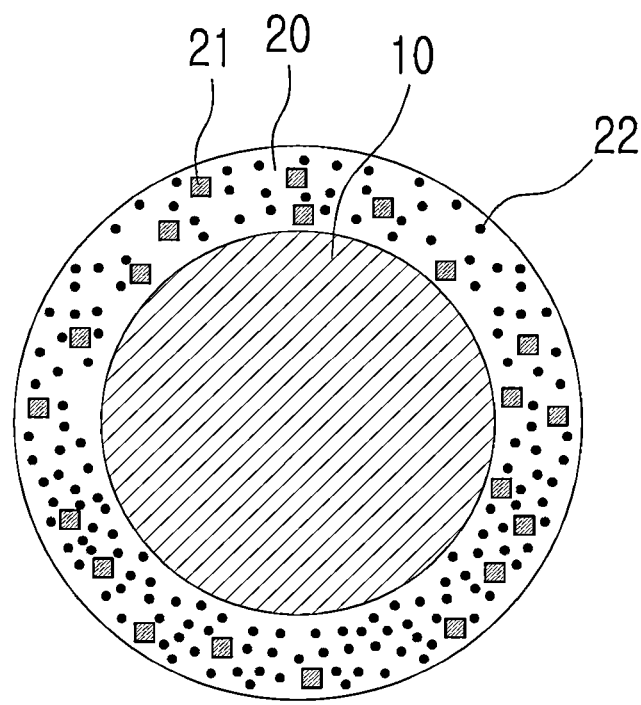
FIG. 2 is a schematic diagram showing the structure of an insulating wire having partial discharge resistance according to the present invention.

FIG. 2 is a schematic diagram showing the structure of an insulating wire having partial discharge resistance according to the present invention. As shown in FIG. 2, the insulating wire having partial discharge resistance according to the present invention includes a round-shaped conductor 10 and an insulation layer 20. The insulation layer 20 contains inorganic particles dispersed in a base resin, where the inorganic particles may include dry zeolite particles 21 and inorganic nanoparticles 22. In this regard, the shape of the conductor 10 is not limited to a ring shape but may also be, for example, a flat shape.

The thickness and the structure of the conductor 10 and the insulation layer 20 may be as defined in the KS standards (KS C 3107). According to the KS standards, the diameter of the conductor 10 ranges from 0.3 mm to 3.2 mm. Further, the standard coating thickness (the average value of the maximum and minimum coating thicknesses) of the insulation layer 20 increases with an increase in the diameter of the conductor 10. More specifically, the standard coating thickness is 10 to 31 μm for the type 2; 14 to 169 μm for the type 1; and 21 to 194 μm for the type 0.

The shape of the conductor constituting the insulating wire having partial discharge resistance according to the present invention is not confined to the example illustrated in FIG. 2 and may be appropriately changed or selected depending on the use purpose of the insulating wire within the range for those skilled in the related art of the present invention (hereinafter, referred to as "those skilled in the art") to achieve the objects of the present invention.

The conductor 10 is mostly made of a copper or aluminum material that has high conductivity, preferably a copper material. Further, the insulation layer 20 is usually made of a polymer base resin, which will be described later.

The base resin of the insulating material that constitutes the insulation layer 20 may include at least one resin selected from the group consisting of polyvinylformal resin, polyurethane resin, heat-resistant polyurethane resin, polyester resin, polyester imide resin, polyamide imide resin, polyimide resin, polyamide resin, and so forth. Preferably, the base resin may include a polyimide resin or a polyamide resin, which has low dielectric constant and excellences in heat resistance and mechanical strengths. This not only enhances the partial discharge resistance of the insulating wire according to the present invention but also satisfies the required properties of the insulating wire in regards to the flexibility of the wire when bending, such as winding the wire, the adhesion between the conductor and the insulation layer, and the mechanical strengths of the wire.

In addition, the insulating material used to form the insulation layer 20 may further include an adhesive agent, that is, an adhesion enhancing agent. The adhesive agent further enhances the adhesion between the conductor 10 and the insulation layer 20, thereby having an effect to provide partial discharge resistance. The adhesive agent as used herein may be selected from melamine-based adhesive agents such as alkoxy (e.g., butoxy) melamine resin; amine-based adhesive agents such as trialkyl amine, etc.; mercaptan-based adhesive agents such as mercaptobenzimidazole, etc.; polycarbodiimide adhesive agents, and so forth. The content of the adhesive agent may be in the range of 1 to 3 parts by weight with respect to 100 parts by weight of the base resin used to form the basal layer 22.

On the other hand, the insulating wire having partial discharge resistance according to the present invention may have the dielectric constant of the insulation layer 20 lowered by using dry zeolite particles 21 for the inorganic particles of the insulation layer 20. The dry zeolite particles 21 as used herein may include dry zeolite particles prepared by processing natural zeolite or synthetic zeolite into micro-sized particles and then dehydrating and drying by heat.

In this regard, the natural zeolite is a microporous ore with micropores having a regular structure. The natural zeolite may be used as molecular sieve in which air or voids take up about 50% of the total volume to the maximum.

The synthetic zeolite can be prepared by slowly crystallizing silica alumina gel made of a combination of alkali, water and an organic substrate. The synthetic zeolite thus obtained has a hollow or porous structure in itself. The porosity of the synthetic zeolite with respect to the total volume may be in the range of 18 to 50%, preferably 38 to 50%. A preparation method for zeolite using a synthesis process makes it possible to produce a pure synthetic zeolite without contaminants. Further, the controlled temperature in the course of the synthesis process results in production of a synthetic zeolite having a more inherent structure than the natural zeolite. The synthetic zeolite may be a crystal with a crystal system that is cubic, monoclinic, hexagonal, rhombohedral, orthorhombic, or the like.

The preferred examples of the synthetic zeolite are presented in Table 1.

and dehydrating and drying by heat to eliminate water ($H_2O$) from the micropores and fill the empty pores with air having a dielectric constant $\in$ of 1. In other words, the dry zeolite particles 21 filled with air having a dielectric constant $\in$ of 1 are added to the insulation layer 20, so the total dielectric constant $\in$ of the insulation layer 20 can be lowered.

The dielectric constant $\in$ and the partial discharge inception voltage (PDIV) of the insulation layer 20 have the relation as defined by the following mathematical equation 1.

$$PDIV = \frac{d}{\varepsilon} \qquad \text{[Equation 1]}$$

In the equation 1, d is the thickness of the insulation layer 20.

In other words, with a decrease in the dielectric constant $\in$ of the insulation layer 20, the partial discharge inception voltage (PDIV) of the insulation layer 20 is raised to suppress the partial discharge. Therefore, the dry zeolite particles 21 included in the insulation layer 20 contains air having the lowest dielectric constant of 1 filled in the micropores formed by a hollow or porous structure, so the total dielectric constant of the insulation layer 20 is controlled in the range of 2.5 to 4 to increase the inception voltage of the insulation layer 20, which has a good effect to suppress corona discharge or partial discharge.

The dry zeolite particles 21 may have, for example, a diameter of 1 to 10 μm, an inner porosity of 45 to 55% and an outer porosity of 30 to 40% out of the total porosity, a bulk density of 41 to 44 lbm/m$^3$, and a surface area of 600 to 700 m$^2$/g.

The dry zeolite particles 21 are micro-sized particles, which are difficult to disperse uniformly in the insulating material used to form the insulation layer 20 but ready for settling. This can result in the rough surface of the insulation layer 20 or deterioration in the insulation withstanding voltage or the like.

Figure 3:
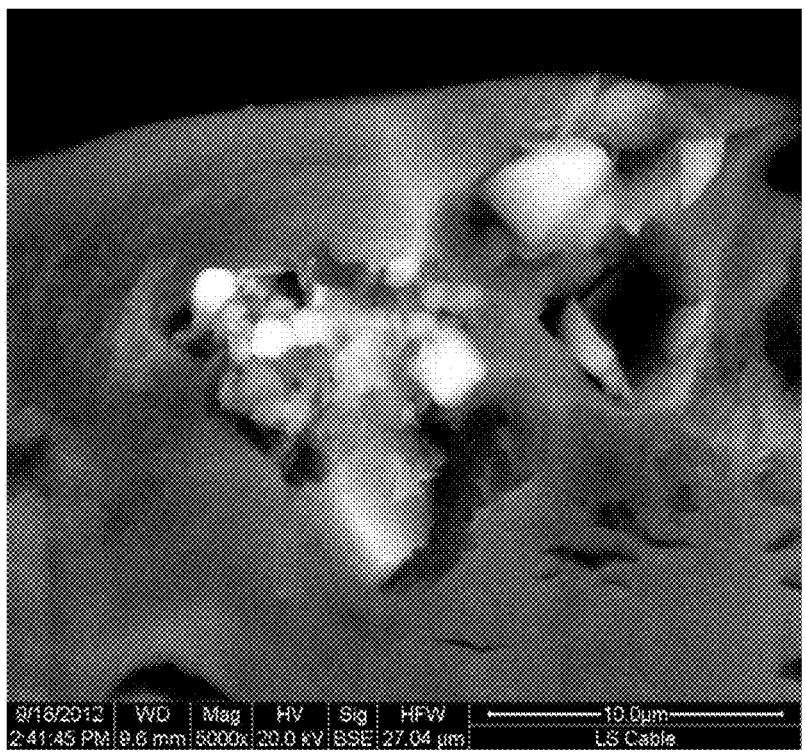
FIG. 3 is an SEM (Scanning Electron Microscopic) image showing the insulating wire having partial discharge resistance according to the present invention in which an insulating material used to form an insulation layer contains micro-sized dry zeolite particles alone.

For reference, FIG. 3 is an SEM (Scanning Electron Microscopic) image showing the insulating wire having partial discharge resistance according to the present invention in which the insulating layer used to form the insulation layer 20 contains micro-sized dry zeolite particles 21 alone. As shown in FIG. 3, when the insulating material contains micro-sized dry zeolite particles 21 alone, a non-uniform dispersion of the dry zeolite particles 21 leads to a settling of the dry zeolite particles 21.

Accordingly, in the insulating wire having particle discharge resistance according to the present invention, the

TABLE 1

| Chemical Formula | Crystal System | Density (g/cc) | Porosity (%) | Pore Diameter (Å) |
|---|---|---|---|---|
| $Na_{12}[(AlO_2)_{12}(SiO_2)_{12}] \cdot 27H_2O$ | Cubic | 1.27 | 47 | 4.2 |
| $Na_4TMA_3[(AlO_2)_7(SiO_2)_{17}] \cdot 21H_2O$ | Cubic | 1.3 | 50 | 4.2 |
| $Na_8TMA[(AlO_2)_9(SiO_2)_{15}] \cdot 28H_2O$ | Cubic | 1.3 | 47 | 4.2 |
| $Na_{86}[(AlO_2)_{86}(SiO_2)_{106}] \cdot 264H_2O$ | Cubic | 1.31 | 50 | 7.4 |
| $Na_{56}[(AlO_2)_{56}(SiO_2)_{136}] \cdot 250H_2O$ | Cubic | 1.25~1.29 | 48 | 7.4 |
| $(Na_2,K_2,Ca,mg)_{29.5}[(AlO_2)_{59}(SiO_2)_{133}] \cdot 235H_2O$ | Cubic | 1.27 | 47 | 7.4 |
| $Ca_2[(AlO_2)_4(SiO_2)_8] \cdot 13H_2O$ | Rhombohedral | 1.45 | 47 | 3.7~4.2 |

Figure 4:
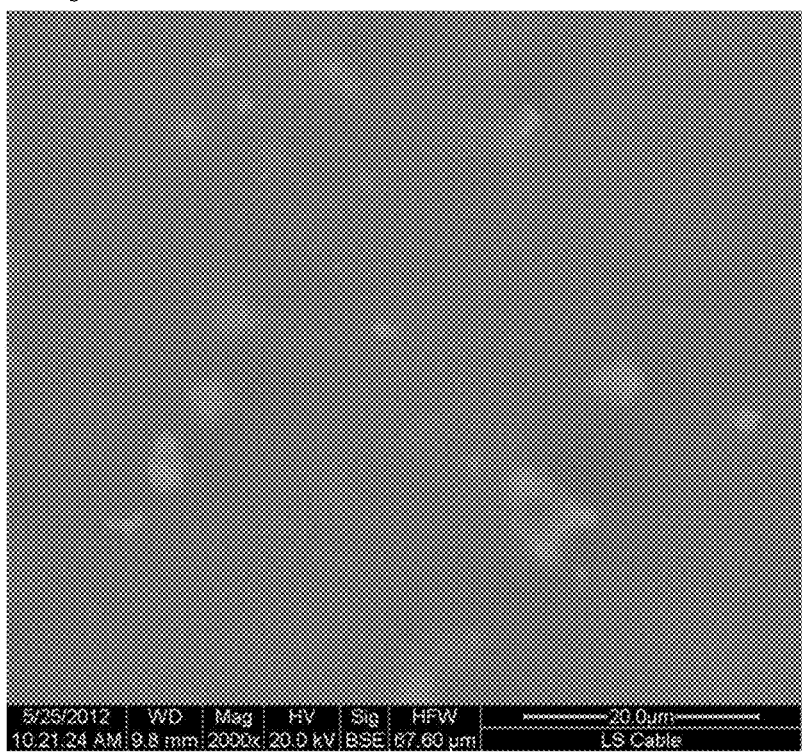
FIG. 4 is an SEM image showing the insulating wire having partial discharge resistance according to the present invention in which an insulating material used to form an insulation layer contains a combination of micro-sized dry zeolite particles and inorganic nanoparticles at a predetermined mixing ratio.

The dry zeolite particles 21 are prepared by processing the natural zeolite or the synthetic zeolite to a micro-scaled size inorganic particles contained in the insulation layer 20 may include a combination of the dry zeolite particles 21 and inorganic nanoparticles 22 at a predetermined mixing ratio. For reference, FIG. 4 is an SEM image showing the insulating wire having partial discharge resistance according to the present invention in which the insulating material used to form the insulation layer 20 contains a combination of the micro-sized dry zeolite particles 21 and inorganic nanoparticles 22 at a predetermined mixing ratio. As shown in FIG. 4, as the insulating material contains a combination of the dry zeolite particles 21 and the inorganic nanoparticles 22 at a predetermined mixing ratio, the dry zeolite particles 21 can be uniformly dispersed in the insulation layer 20.

The inorganic nanoparticles 22 not only help achieve a uniform dispersion of the dry zeolite particles 21 to suppress the settling of the dry zeolite particles 21 but also have a good effect to prevent the breakdown of the insulation layer 20 caused by the partial discharge and provide a high partial discharge inception voltage due to the hollow or porous structure of zeolite. For this purpose, the inorganic nanoparticles 22 are required to have good dispersion properties, an ultrafine particle size, preferably 4 to 100 nm, more preferably 10 to 50 nm, a high specific surface area (BET method), preferably 100 to 300 $m^2/g$, a high purity, preferably 95% or above, spherical particle shape, pore-free property, and so forth. There are various known methods for improving these properties.

For example, German Patent No. 4209964 discloses an inorganic nanoparticle of which the surface is modified in order to be easily dispersed in a resin, such as, for example, silanized by preparing a surface mixture and then adding a silane compound, such as amine-based silane, phenyl-based silane, aniline-based silane, or silane having a hydrocarbon functional group, to the surface mixture. More specifically, the surface-silanized inorganic nanoparticles include the inorganic nanoparticles added to a solvent, such as toluene, xylene, ethanol, cresol, etc.

The insulating material constituting the insulation layer 20, that is, the insulating material in which inorganic particles including a combination of the dry zeolite particles 21 and the inorganic nanoparticles 22 are dispersed in the polymer base resin can be prepared by a known method, which may employ the ball-milling method as disclosed in U.S. Pat. No. 6,403,890; the mechanical method based on high shear mixing in U.S. Pat. No. 4,493,873; the simple agitation method in U.S. Pat. No. 6,180,888; and the sol-gel method in JP Laid-Open Publication No. 2003-36731.

In the insulating wire having partial discharge resistance according to the present invention, the inorganic particles contained in the insulating material used to form the insulation layer 20 may be used in an amount of 10 to 30 parts by weight with respect to 100 parts by weight of the base resin. The content of the inorganic particles less than 10 parts by weight is too insignificant to acquire partial discharge resistance, while the content of the inorganic particles greater than 30 parts by weight results in poor flexibility of the insulation layer 20, possibly causing defectives to occur when the coils using the insulation layer 20 is wound up.

Further, the content of the dry zeolite particles 21 in the inorganic particles may be 10 to 60 parts by weight, preferably 20 to 50 parts by weight with respect to 100 parts by weight of the inorganic particles, and the content of the inorganic nanoparticles 22 in the inorganic particles may be 40 to 90 parts by weight with respect to 100 parts by weight of the inorganic particles. The content of the dry zeolite particles 21 less than 10 parts by weight leads to the low dielectric constant of the insulation layer 20 and hence poor partial discharge resistance. On the other hand, the content of the dry zeolite particles 21 greater than 60 parts by weight causes a non-uniform dispersion of the dry zeolite particles 21 in the insulating material used to form the insulation layer 20 and thus brings about an issue of stability, such as a settling of the dry zeolite particles 21.

As already described above, the insulating material used to form the insulation layer 20 of the insulating wire having partial discharge resistance according to the present invention contains a combination of the micro-sized dry zeolite particles 21 and the inorganic nanoparticles 22 at a predetermined mixing ratio in the polymer base resin. Due to the maximized surface area with the hollow or porous structure, the dry zeolite particles 21 have been used for ion filters of water softening/purification systems or industrial exhaust gas purification systems, catalysts for increasing the reaction rate of a chemical process, or other use purposes. However, the dry zeolite particles are difficult to process into nano-sized particles and thus problematic in regards to an issue of dispersion in a medium such as a polymer resin.

Accordingly, the insulating wire having partial discharge resistance according to the present invention uses the dry zeolite particles 21 added to the insulating material constituting the insulation layer 20, so the air filled in the micropores in the hollow or porous structure of the dry zeolite particles 21 helps the insulation layer 20 acquire a low dielectric constant and a high partial discharge inception voltage and thereby has a good effect to suppress the partial discharge. Also, the insulating wire having partial discharge resistance according to the present invention uses the micro-sized dry zeolite particles 21 in combination with the inorganic nanoparticles 22 at a predetermined mixing ratio to solve the problem concerning the dispersion of the dry zeolite particles 21. This enhances the flexibility of the insulating wire, the adhesion between the conductor 10 and the insulation layer 20, the insulation withstanding voltage of the insulation layer 20, and the mechanical properties.

EXAMPLES

1. Preparation Example

The ingredients as shown in the composition of Table 2 are added at the defined contents and blended together with a high-speed agitator (JS-MILL; NCTech Ltd.) to obtain each insulating material according to the Examples and the Comparative Examples. The insulating material is applied on a ring-shaped copper conductor having a diameter of 1.1 mm by way of a coating/application device (SICME NEV, Italy) and then cured at a linear velocity of 32 m/min in a baking furnace at 360 to 560° C. to form each insulating wire specimen with an insulation layer having a thickness of 40 μm according to the Examples and the Comparative Examples.

TABLE 2

|  | Example | | | Comparative Example | | |
|---|---|---|---|---|---|---|
|  | 1 | 2 | 3 | 1 | 2 | 3 |
| Base resin | 100 | 100 | 100 | 100 | 100 | 100 |
| Inorganic particles | 18 | 18 | 18 | 18 | 18 | 18 |
| Zeolite particles with respect to 100 parts by weight of inorganic particles | 25 | 33 | 50 | — | 5 | 67 |
| Inorganic nanoparticles with | 75 | 67 | 50 | 100 | 95 | 33 |

TABLE 2-continued

|  | Example | | | Comparative Example | | |
|---|---|---|---|---|---|---|
|  | 1 | 2 | 3 | 1 | 2 | 3 |
| respect to 100 parts by weight of inorganic particles | | | | | | |

Base resin: Polyamide imide (Product name: MS-30, manufactured by SungMoon)

Zeolite particles: Dry zeolite particles (Product name: 96096, manufactured by SIGMA)

Inorganic nanoparticles: nano silica

2. Evaluation Method of Properties and Evaluation Results

<Stability Evaluation of Insulating Material>

Each of the insulating wires prepared in the Examples and the Comparative Examples is stored indoor at the room temperature without exposure to the direct rays of the sun for one month and then evaluated in regards to the settling of the resin component, the zeolite particles, or the inorganic nanoparticles in the insulating material. In Table 3, "O" denotes an occurrence of the settling, and "x" denotes no occurrence of the settling.

<Evaluation of Dielectric Constant>

Each of the insulating wires prepared in the Examples and the Comparative Examples is used to form a flat coating film having a thickness of 0.2 to 0.5 mm. Then, a voltage having a frequency of 60 Hz to 100 MHz is applied to the coating film to measure the dielectric constant.

<Evaluation of Flexibility of Insulation Coating>

The specimen of each insulating wire prepared in the Examples and the Comparative Examples is wound around a polished mandrel having a predetermined diameter given by the IEC 60851 standards continuously thirty times or more. In terms of the coating flexibility, the coating flexibility is determined as "good" when the specimen has no crack and "bad" when the specimen has cracks.

<Evaluation of Breakdown Voltage>

A pair of specimens of each insulating wire prepared in the Examples and the Comparative Examples are twisted at the one end with a defined load as defined in the IEC 60851 standards to prepare a specimen twisted with two stripes. A test voltage is then applied between the conductors to determine the voltage at which the insulation coating of the specimen is broken. Generally, the wire is evaluated as "good" in terms of the breakdown voltage when the breakdown voltage is 8,000 V or higher.

<Evaluation of Partial Discharge Resistance>

A pair of specimens of each insulating wire prepared in the Examples and the Comparative Examples are twisted at the one end with a defined load as defined in the ASTMD 1868-07 standards to prepare a specimen twisted with two stripes. Subsequently, a voltage having a frequency of 20 kHz and a sine curve of 2.0 kVp is applied to the bare conductors on either end of the specimen to determine the time taken until a short circuit occurs.

<Evaluation of Partial Discharge Inception Voltage>

A pair of specimens of each insulating wire prepared in the Examples and the Comparative Examples are twisted at the one end with a defined load as defined in the ASTMD 2275-01 standards to prepare a specimen twisted with two stripes. Subsequently, a voltage having a frequency of 50 to 60 kHz is applied to the bare conductors on either end of the specimen at a predetermined rate to determine the voltage at which a partial discharge (100 pC or above) occurs.

The evaluation results for the Examples and the Comparative Examples are presented in Table 3 below.

TABLE 3

|  | Example | | |
|---|---|---|---|
|  | 1 | 2 | 3 |
| Stability of insulating material | O | O | O |
| Dielectric constant | 3.3 | 3.2 | 2.9 |
| Flexibility of insulation coating | Good | Good | Good |
| Breakdown voltage (V) | 11000 | 12000 | 11600 |
| Partial discharge resistance | 5 h 30 min | 8 h 10 min | 12 h 45 min |
| Partial discharge inception voltage (V) | 625 | 638 | 665 |

|  | Comparative Example | | |
|---|---|---|---|
|  | 1 | 2 | 3 |
| Stability of insulating material | O | O | X |
| Dielectric constant | 3.9 | 3.7 | 2.9 |
| Flexibility of insulation coating | Good | Good | Bad |
| Breakdown voltage (V) | 12500 | 11500 | 8500 |
| Partial discharge resistance | 3 h 30 min | 4 h 42 min | 19 h 30 min |
| Partial discharge inception voltage (V) | 596 | 603 | 675 |

As can be seen from Table 3, the insulating wire specimens of the Examples 1, 2 and 3 corresponding to the insulating wires having partial discharge resistance according to the present invention contain dry zeolite particles having a hollow or porous structure in the insulation layer and have the total dielectric constant of the insulation layer lowered to 2.9 to 3.3 due to the air having a dielectric constant $\in$ of 1 as filled in the micropores of the dry zeolite particles. As a result, the partial discharge inception voltage is increased to 625 to 665 V, which implies that the partial discharge is effectively suppressed.

Besides, the insulating wire specimens use micro-sized dry zeolite particles in combination with inorganic nanoparticles at a predetermined mixing ratio, which results in a uniform dispersion of the dry zeolite particles without a settling. This further leads to excellences in properties, such as the stability of the insulating material, the flexibility of the insulation coating, the breakdown voltage, and the partial discharge properties.

Contrarily, each specimen of the insulating wires according to the Comparative Examples 1 and 2 contains none of the zeolite particles or an extremely small amount of the zeolite particles, which is too insignificant to provide partial discharge resistance, and particularly has a partial discharge inception voltage too low to fundamentally suppress the partial discharge. Further, the specimen of the insulating wire according to the Comparative Example 3 contains an excessively large amount of the zeolite particles, causing a non-uniform dispersion and a settling of the zeolite particles, and thus exhibits poor properties in regards to the stability of the insulating material and the flexibility of the insulation coating.

The present invention has been described with reference to the preferred exemplary embodiments of the present invention, and it would be understood by those skilled in the art that various changes and modifications may be made without departing from the technical conception and essential features of the present invention. Thus, it is clear that all modifications are included in the technical scope of the present invention as long as they include the components as claimed in the claims of the present invention.

What is claimed is:

1. An insulating wire having partial discharge resistance, comprising a conductor and an insulation layer,
   the insulation layer being disposed to cover around the conductor and containing a polymer base resin and inorganic particles, the polymer base resin including at least one of a polyimide resin and a polyamide imide resin,
   the content of the inorganic particles being 10 to 30 parts by weight with respect to 100 parts by weight of the polymer base resin, and
   the inorganic particles comprising 10 to 60 parts by weight of dry zeolite particles and 40 to 90 parts by weight of inorganic nanoparticles with respect to 100 parts by weight of the inorganic particle,
   wherein the dry zeolite particles have a porosity of 18 to 50% with respect to a total volume thereof, and each has a diameter of 1 to 10 μm,
   wherein the inorganic nanoparticles includes at least one of silica, alumina, titanium dioxide, zirconia, yttria, mica, clay, chromium oxide, zinc oxide, iron oxide, magnesium oxide, calcium oxide, scandium oxide, and barium oxide, and each is pore free and has a diameter of 4 to 50 nm,
   wherein the insulation layer contains air filled in micropores of the dry zeolite particles and has a dielectric constant in a range of 2.5 to 3.

2. The insulating wire having partial discharge resistance as claimed in claim 1, wherein the dry zeolite particles have an inner porosity of 45 to 55% and an outer porosity of 30 to 40% out of the total porosity.

3. The insulating wire having partial discharge resistance as claimed in claim 2, wherein the dry zeolite particles are prepared by processing at least one synthetic zeolite selected from the group consisting of $Na_{12}[(AlO_2)_{12}(SiO_2)_{12}]\cdot27H_2O$, $Na_4TMA_3[(AlO_2)_7(SiO_2)_{17}]\cdot21H_2O$, $Na_8TMA[(AlO_2)_9(SiO_2)_{15}]\cdot28H_2O$, $Na_{86}[(AlO_2)_{86}(SiO_2)_{106}]\cdot264H_2O$, $Na_{56}[(AlO_2)_{56}(SiO_2)_{136}]\cdot250H_2O$, $(Na_2, K_2, Ca, Mg)_{29.5}[(AlO_2)_{59}(SiO_2)_{133}]\cdot235H_2O$ and $Ca_2[(AlO_2)_4(SiO_2)_8]\cdot13H_2O$ to a micro-scaled size and then dehydrating and drying by heat.

4. The insulating wire having partial discharge resistance as claimed in claim 1, wherein the conductor has a round or flat cross section.

5. The insulating wire having partial discharge resistance as claimed in claim 1, wherein the insulation layer comprises at least one adhesive agent selected from the group consisting of a melamine-based compound, an amine-based compound, a mercaptan-based compound and a polycarbodiimide-based compound in an amount of 1 to 3 parts by weight with respect to 100 parts by weight of the polymer base resin.

* * * * *